July 13, 1926.
T. ZUTTER
1,592,409
METHOD AND APPARATUS FOR ANALYZING GAS
Filed Nov. 7, 1925
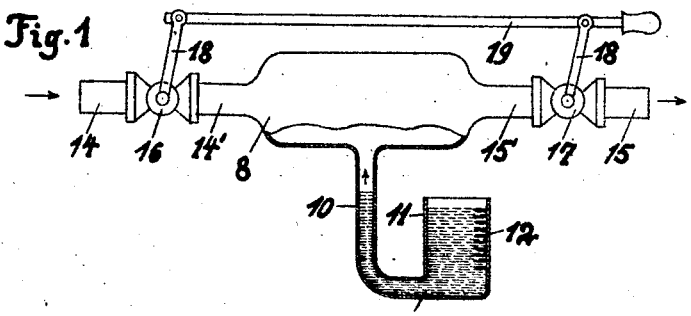
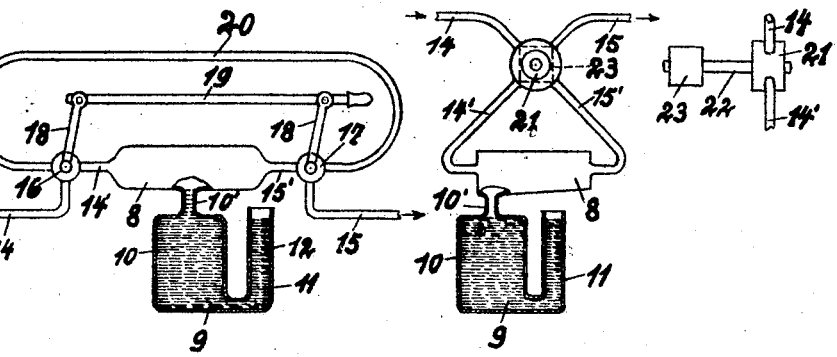
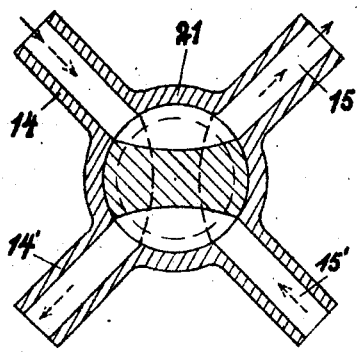
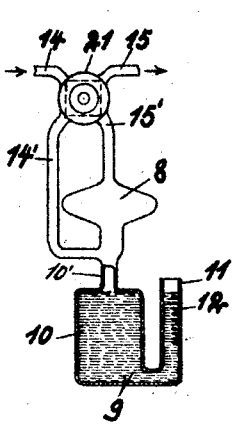
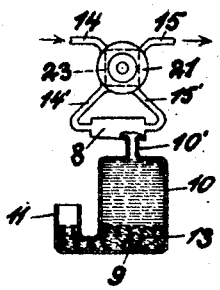
Inventor:
Theodor Zutter
per
Attorney Patented July 13, 1926.

1,592,409

UNITED STATES PATENT OFFICE.

THEODOR ZUTTER, OF AACHEN, GERMANY.

METHOD AND APPARATUS FOR ANALYZING GAS.

Application filed November 7, 1925, Serial No. 67,620, and in Germany November 10, 1924.

This invention relates to a gas-analyzing method and apparatus of the kind in which the measuring chamber, through which the gas current flows, is used at the same time as an absorption chamber.

According to the invention, the measuring vessel is shut off with relation to the gas supply and gas outlet before each of the successive analyses and the partial vacuum produced in the measuring vessel as soon as the absorption begins is utilized as a means for feeding the liquid absorbent into and favorably distributing it in the measuring vessel which then serves as an absorption vessel. The absorbent is contained in an approximately U-shaped reservoir, one leg of which is connected with the measuring vessel while its other leg is in communication with the atmosphere. According as the absorbent rises into the measuring vessel, its level in the leg of the reservoir communicating with the atmosphere sinks so that the quantity of the gas constituent absorbed may be directly read at that leg from a suitable scale provided on the same. The analyzer is rendered particularly efficient by making the connection between the measuring vessel and the absorbent reservoir as narrow as possible and by making the measuring vessel of a flat shape with a small height but a large bottom surface. It is attained thereby that the gas is protected against the influence of the absorbent before the analysis, while the gas and the absorbent enter into an intensive reaction on a very large surface immediately upon the beginning of the analysis.

In the accompanying drawing there are illustrated several devices for carrying out the method according to the invention.

Fig. 1 is a diagrammatic view, partly in section, of a hand analyzing apparatus according to the invention, Fig. 2 is a slightly modified form of this apparatus, Fig. 3 is a view, partly in section, of an automatically operated apparatus, Fig. 4 is an end view of the upper part of the apparatus according to Fig. 3, seen from the left, Fig. 5 is a section, on an enlarged scale, through a control valve such as used in Fig. 3 or any of the succeeding figures, Fig. 6 is a view of an automatic apparatus having a measuring vessel of another shape, Fig. 7 is a view of another modified form in which the absorbent reservoir contains still another liquid heavier than the absorbent.

In all of the figures, 8 designates the measuring vessel and 9 the reservoir containing the liquid absorbent. The vessel 8 has an elongated cylindric, prismatic or lentiform shape of a small height but with a large bottom. The reservoir 9 has two legs 10 and 11. The leg 10 is in communication with the vessel 8, while the leg 11 communicates with the atmosphere. The leg 10 is either narrow throughout, as shown in Fig. 1, or it has a narrow contracted neck portion 10' through which connection is established with the vessel 8, as shown in Figs. 2, 3, 6 and 7. Owing to this narrow passage of communication between the reservoir 9 and the vessel 8 the gas when flowing freely through the latter is not acted upon by the absorbent, or vice versa.

The leg 11 of the reservoir 9 is preferably provided with a scale 12 at which the level of the absorbent in that leg indicates during the analyses the quantities of absorbable constituents contained in the gaseous mixture being examined. Instead of or in addition to the scale 12, there may be arranged in the leg 11 a float connected with an indicating instrument. This float, the indicating instrument and the connecting means between them may be of any well known and approved construction and type and therefore are not shown in the drawing. In order to increase the measuring force in the vessel 9, its lower portion may be filled with a liquid heavier than the absorbent such as mercury, as indicated at 13 in Fig. 7.

The gas to be examined is supplied to the vessel 8 through a conduit 14, 14' and after passing through the vessel 8 it is led off into the atmosphere through a conduit 15, 15'. Suitable control devices disposed in the said conduits serve to establish communication between the vessel 8 and the conduits or to interrupt this communication.

The control devices may be of various constructions. According to Fig. 1, which shows a hand apparatus, the control devices consist of ordinary two-way plug valves 16 and 17 disposed in the conduits 14, 14' and 15, 15', respectively. The valve plugs are connected by levers 18 with a common shifting rod 19. By shifting this rod toward one side or the other, the two valves 16, 17 are either simultaneously opened or closed. If the valves are open the gas passes from the source of supply through the conduits 14, 14', the vessel 8 and the conduits 15', 15 into the atmosphere. If the valves are closed the further flow of gas is stopped and a certain charge of gas shut up in the vessel 8.

In order to permit the flow of gas from the source into the atmosphere to continue also in case the vessel 8 is shut off with relation to the conduits 14, 14', and 15, 15', there may be provided according to Fig. 2 a by-pass conduit 20 the ends of which are connected to the casings of the valves 16 and 17. In this case, the valves usually establish communication between the conduit sections 14, 14' and 15, 15' so that the gas flows through the vessel 8, while when an analysis is being carried out the said communication is interrupted and communication established between the conduit sections 14 and 15 and the by-pass conduit 20 so that the gas may continue its flow through 14, 20 and 15, as will be readily understood with reference to Fig. 2.

In Figs. 3-7 of the drawing, the control device consists of one single valve 21 which is common to all conduits. As shown more particularly in Fig. 5, the valve casing has four ports communicating with the conduit sections 14, 14', 15, 15'. The valve itself is adapted to take two positions, one being indicated in full lines and the other in dotted lines in Fig. 5. When the valve is in position shown in full lines, which it assumes during an analysis, the gas flows directly from the supply conduit 14 to the outlet 15, while the conduit sections 14', 15' and the vessel 8 are shut off with relation to the conduits 14, 15. When the valve is in the dotted position, the gas flows through the conduits 14, 14', the vessel 8 and the conduits 15', 15 into the atmosphere. The valve 21 may be operated automatically and periodically by any suitable means imparting impartial revolutions to the valve shaft 22, such as by an electric relay with intermittent contacts or by a tilting-vessel mechanism. This means which does not form part of this invention, is indicated only diagrammatically at 23, see more particularly Fig. 4.

The course of the process is the same in all cases. The gas usually flows from the source of gas through the conduits 14, 14', vessel 8 and conduits 15', 15 into the atmosphere. If an analysis should take place, the valves 16, 17 or 21 are positioned so as to shut off the vessel 8 from the supply and outlet conduits 14, 15 so that a definite quantity of gas is shut up in the vessel 8. The absorbent contained in the vessel 9 immediately acts on the gas in the vessel 8 and begins to absorb the absorbable constituent of the gas, thereby producing in the vessel 8 a partial vacuum which causes the absorbent to be sucked through the leg 10 or its neck 10' into the vessel 8 and to be spread therein on the large bottom surface, so that it will rapidly absorb all absorbable constituents of the gas and fill out the space that becomes free in the vessel 8 owing to the absorption of those constituents. At the same time the level of the absorbent in the reservoir leg 11 sinks and indicates on the scale 12 the quantity of a certain constituent of the gas mixture. After the asorption has been terminated, the valves 16, 17 or 21 are positioned so as to cause fresh gas to flow again through the vessel 8 and drive out of the same the residue of gas left therein during the analysis. At the same time the absorbent that has entered the vessel during the analysis drops back into the vessel 9. By changing again the position of the valves another ananlysis may be begun.

I wish it to be understood that numerous changes may be made within the spirit of this invention as regards the form of the measuring vessel and absorbent reservoir, the connection between the same and the construction of the control devices as well as that of the indicating means.

Having thus described my invention, what I claim as new and desire to secure by Letters Patent, is:—

1. The herein described method of analyzing gas in a gas measuring chamber connected with a reservoir containing the absorbent, which consists in shutting up a charge of gas in the measuring chamber and using the partial vacuum produced in the measuring chamber by the beginning absorption for sucking the absorbent from the reservoir into and distributing it in the measuring chamber so as to cause an intensive reaction to be set up between the absorbent and the gas in the chamber.

2. A gas-analyzing apparatus, comprising a measuring vessel of a small height and with a large bottom surface, a U-shaped reservoir containing a liquid absorbent, an open connection between one leg of the reservoir and the atmosphere and a narrow connecting duct between the other leg of the reservoir and the measuring vessel at the lowermost point of the latter, gas supply conduits and gas outlet conduits connected with the measuring vessel for allowing of the gas current to be passed through this vessel; and control devices disposed in the said conduits and adapted to shut off the measuring vessel with relation to the gas supply and the atmosphere during the analyzing.

3. A gas-analyzing apparatus, comprising a measuring vessel of a small height and with a large bottom surface, a U-shaped reservoir containing an absorbent and a liquid heavier than the absorbent and occupying the lower portion of the reservoir, an open connection between one leg of the reservoir and the atmosphere and a narrow connecting duct between the other leg of the reservoir and the measuring vessel, gas supply conduits and gas outlet conduits connected with the measuring vessel, and control valves disposed in the said conduits and adapted to shut off the measuring vessel with relation to the gas supply and the atmosphere for the purpose of shutting up in the measuring vessel a charge of gas to be analyzed.

In testimony whereof I have signed my name to this specification.

THEODOR ZUTTER.